Feb. 1, 1966

H. J. FINDLEY 3,232,170

HOBBING MACHINE

Filed Feb. 18, 1963

INVENTOR.
HOWARD J. FINDLEY
BY Williams, David,
Hoffmann & Yount
ATTORNEYS

Feb. 1, 1966    H. J. FINDLEY    3,232,170
HOBBING MACHINE
Filed Feb. 18, 1963    3 Sheets-Sheet 2

INVENTOR.
HOWARD J. FINDLEY
BY Williams, David,
Hoffmann & Yount.
ATTORNEYS

United States Patent Office 3,232,170
Patented Feb. 1, 1966

3,232,170
HOBBING MACHINE
Howard J. Findley, Lyndhurst, Ohio, assignor to Textron Inc., Providence, R.I., a corporation of Rhode Island
Filed Feb. 18, 1963, Ser. No. 259,205
15 Claims. (Cl. 90—4)

The present invention relates to a hobbing machine and, more particularly, to a machine having servodrives for effecting the relative movements of the workpiece and the hob during the hobbing operation.

An important object of the present invention is to provide a new and improved hobbing machine wherein the hob arbor is rotated by a motor in the hob head of the machine which is part of a servodrive and is connected to drive the shaft on which the hob is mounted by a substantially direct drive connection and wherein the spindle is rotated by a servodrive including a motor in the workhead of the machine and the relative feed movement between the hob head and workhead is effected by a motor of a third servodrive.

Another object of the present invention is to provide a new and improved hobbing machine as in the next preceding paragraph wherein the servodrives are interlocked by a control system and preferably a system wherein control signals derived from the drive for the hob are used to control the other servodrives and to interlock the operation of the latter with the hob arbor.

A still further object of the present invention is to provide a new and improved hobbing machine wherein the rotation of the hob arbor and rotational and relative translatory movements of the spindle are effected by servodrives which are individual to each movement and which are interlocked by a control signal system which maintains the movements synchronized.

In accordance with the present invention, a servodrive is provided in the hob head of a hobbing machine for effecting rotation of the hob arbor and servodrives are also provided for effecting the angular rotation of the workpiece and the relative feed movement between the hob arbor and workpiece which occurs axially of the workpiece and preferably servodrives are also provided for effecting axial advance of the hob arbor and the infeed of the hob arbor, the latter drives being located in the hob head of the hobbing machine.

Further in accordance with the present invention, a signal is provided for controlling one of the drives and other signals are derived from that signal or from the controlled drive to effect operation of the other servodrives in synchronism with the first controlled drive. In accordance with one feature of the present invention, a master control panel is provided and a common signal source provides signals for operating a plurality of machines in synchronism with each other, with all the machines being controllable from the master control panel.

Further objects and advantages of the present invention will be apparent from the following detailed description of the preferred embodiment thereof made with reference to the accompanying drawings forming a part of the present specification and in which.

Figure 1:
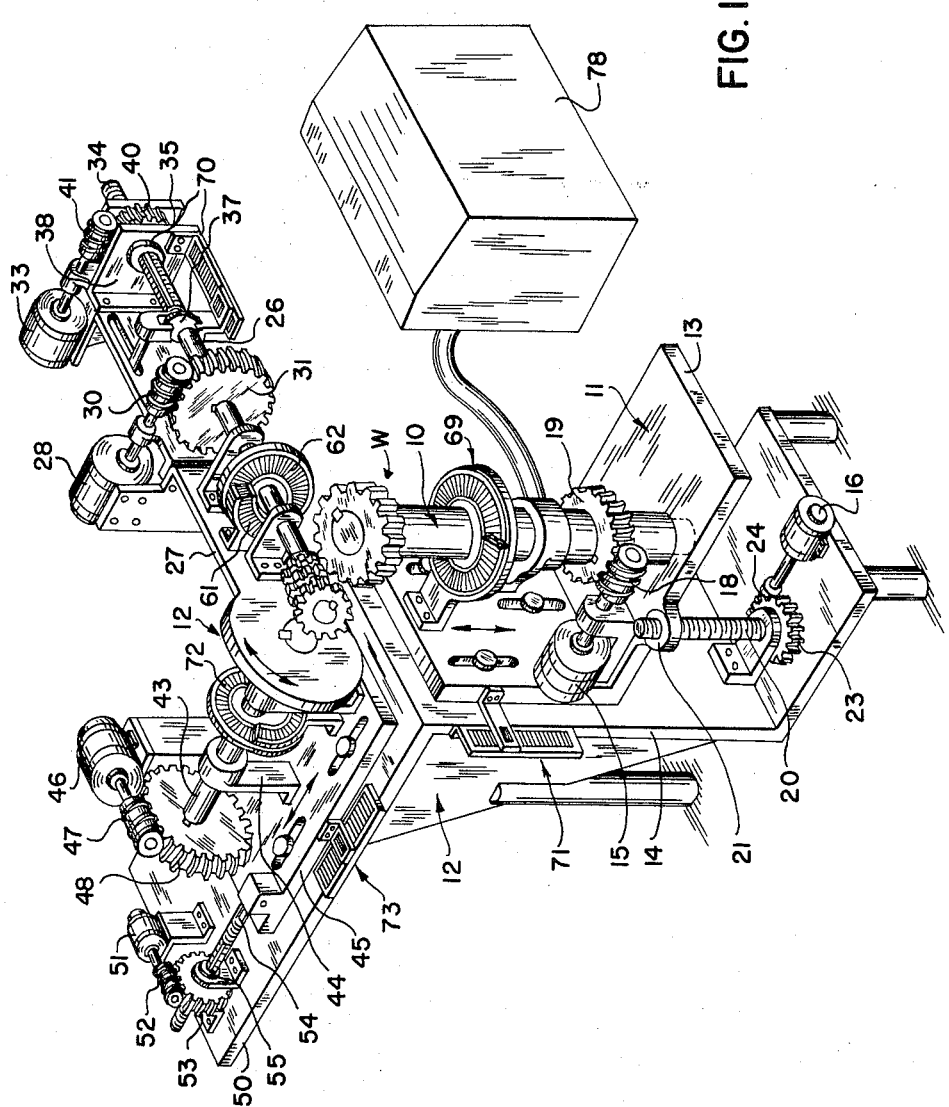
FIG. 1 is a perspective showing, somewhat diagrammatic, of the basic parts of a hobbing machine.

Referring to the drawings, FIG. 1 illustrates the basic arrangement of a hobbing machine, somewhat diagrammatically, and, as shown therein the hobbing machine comprises a rotatable work-supporting spindle 10 adapted to support and rotate a workpiece W which is to be cut by a rotating hob H. The hobbing operation is well known to those skilled in the art and in the type of machine illustrated, the rotatable work-supporting spindle 10 is part of a workhead 11 which is movable vertically on a frame 12 to effect a relative feed movement between the hob H and workpiece W. The workhead 11 comprises a spindle support member 13 mounted on a vertical part 14 of the frame 12 for vertical movement and rotatably supports the work spindle 10 with the axis thereof disposed vertically. The work spindle 10 is adapted to be rotated by a reversible motor 15 and to be moved axially to effect the relative feed by a reversible motor 16, the motors 15, 16 being part of servodrives for respectively rotating the spindle 10 and moving the spindle 10 axially. The motor 15 is mounted on the support member 13 of the workhead 11 and has a motor shaft to which a worm 18 is fixed. The worm 18 meshes with a worm wheel 19 fixed to the spindle 10 so that rotation of the motor 15 will effect rotation or indexing of the spindle through the worm 18 and worm wheel 19. The motor 16 is mounted on the frame 12 and operates to move the spindle axially by driving a vertical lead screw 20 rotatably supported by the frame 12 and threadingly engaging a nut element 21 fixed to the support member 13 of the workhead 11. Rotation of the lead screw 20 will effect vertical movement of the support plate 13 and, in turn, axial movement of the rotatable work-supporting spindle 10. The motor 16 is connected to rotate the lead screw 20 through a substantially direct drive to the lead screw comprising a worm wheel 23 fixed to the lead screw 20 and a cooperating worm 24 fixed to the shaft of the motor 16.

The hob H is rotated as the workpiece W is moved thereby to effect a cutting of the workpiece, as is well understood by those skilled in the art, and is supported on a hob drive shaft 26 rotatably supported on a hob shaft support member 27. The hob drive shaft 26 is rotatably suported by brackets fixed to the hob shaft support member 27 and which also support the shaft for axial movement relative to the hob shaft support member. The hob drive shaft 26 is driven by an electric motor 28 which is part of a servodrive for effecting rotation of the hob H. The motor 28 is fixed to the hob shaft support member 27 and is connected to rotate the hob drive shaft 26 through a substantially direct drive connection comprising a worm 30 fixed to the shaft of the motor and a worm wheel 31 slidably keyed to the shaft 26. The gear 31 is held against axial movement relative to the hob arbor support member 27 by means not shown in the drawings.

The hob H is adapted to be shifted axially by operation of a hob shift motor 33 mounted on the hob shaft support member 27 and adapted to relatively rotate a lead screw 34 and a cooperating nut 35. The lead screw 34 is disposed to form an extension of the hob drive shaft 26 and is swivelly connected to the inner end of the shaft 26 by connecting means 37 so that the hob arbor shaft 26 and the lead screw 34 are interconnected to shift axially as a unit but are capable of relative rotation with respect to each other. The lead screw 34 is axially shiftable and rotatable relative to a support bracket 38 to which the nut 35 is fixed. The lead screw 34 threads in the nut 35 and shifts axially when a worm wheel 40 splined to the shaft is rotated. The worm wheel 40 meshes with and is rotated by a worm gear 41 fixed to the shaft of the motor 33.

The hob shaft support member 27 is supported for angular rotation about an axis perpendicular to the axis of the hob drive shaft 26 and to this end, is fixed to a shaft 43 rotatably supported by brackets 44 on a base plate 45. The shaft 43 lies along an axis which is a radius of the axis, or an extension of the axis, of the work spindle 10 and is rotatable by a motor 46 to angularly position the hob shaft support member 27 and, in turn, the hob H. The motor 46 is a reversible motor and is connected to rotate the shaft 43 by a worm gear 47 fixed to the shaft of the motor 46 and meshing with a worm wheel 48 fixed to the shaft 43.

The base plate 45 is supported on a horizontal portion 50 of the frame 12 for movement toward and away from the work spindle 10 along a line parallel to the shaft 43. The movement of the base plate 45 toward and away from the axis of the work spindle 10 is effected by operating a reversible motor 51 operatively connected, by a worm 52 fixed to the shaft thereof and a cooperating worm gear 53 splined to a lead screw 54, to rotate the lead screw 54 relative to a stationary nut 55. The lead screw 54 extends parallel to the shaft 43 and is fixed to the base plate 45. The worm gear 53 is slidably splined to the lead screw 54 and is held against axial movement so that rotation of the worm gear 53 effects an axial movement of the lead screw 54 by a threading action to move the base plate 45 to effect an in or out feed of the hob H.

As will be appreciated by those skilled in the art, the structure mounted on the base plate 45 for movement therewith may be termed the hob head of the hobbing machine.

In the above description, the motors 15, 16, 28, 33, 46 and 51 have been described as parts of a servodrive and in the preferred embodiment, these motors are reversible electric motors, although it will be understood by those skilled in the art that servodrives utilizing hydraulic motors may also be employed.

In the preferred and illustrated embodiment, the electric motors are controlled in accordance with the phase relationship of a command signal and of a feedback signal derived from the output of the motor. To this end, signal generating means is provided for each of the motors 15, 16, 28, 33, 46 and 51 to provide a feedback signal indicative of the output of the motor. A feedback signal generator 60 is associated with the hob shaft 26 and provides a feedback signal for use in controlling the motor 15 for rotating the spindle. The signal generator 60 is of a conventional induction type which provides an output signal, a pulse signal in the illustrated embodiment, which has a frequency dependent upon the rate of movement of the element with which it is associated. The signal generator 60 includes stationary exciting windings 61 supported adjacent the shaft 26 and a cooperating inductively excited winding 62 which will have an output signal of a frequency dependent upon the rate of rotation of the hob shaft 26 and the direction of rotation. If the exciting windings 61 are excited with a pulse signal of frequency X, the output of the winding 62 will have a frequency X when the hob shaft is stopped and a frequency of $X-A$ or $X+A$ depending upon the direction of rotation where A is a function of the rate of rotation and where $A=X$ at a synchronized rate of rotation. This type of inductive signal generator is well known to those skilled in the art and it is not believed necessary to describe the signal generator in further detail.

Figure 2:
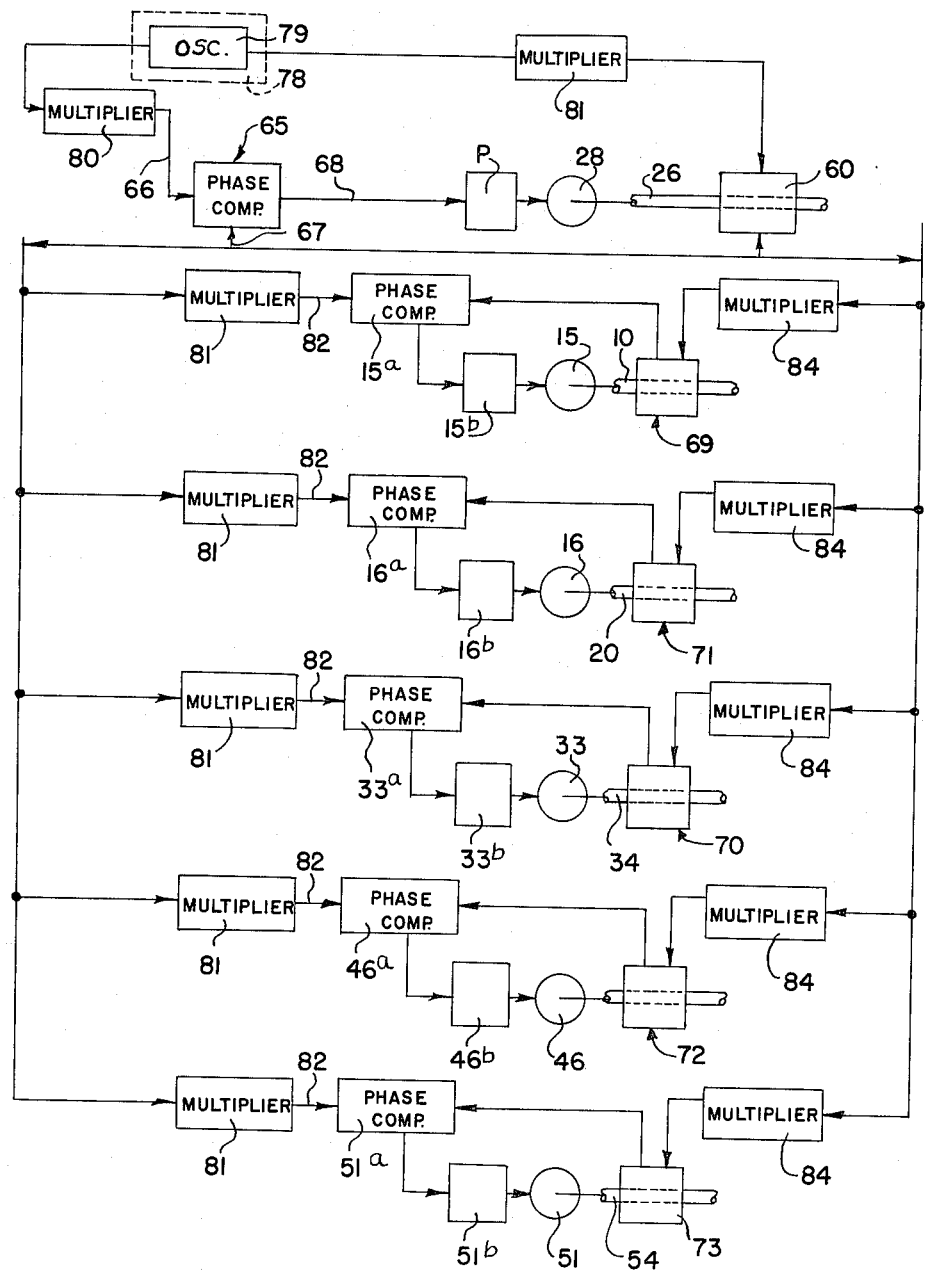
FIG. 2 is a block diagram showing the control circuit for the machine of FIG. 1.
Figure 4:
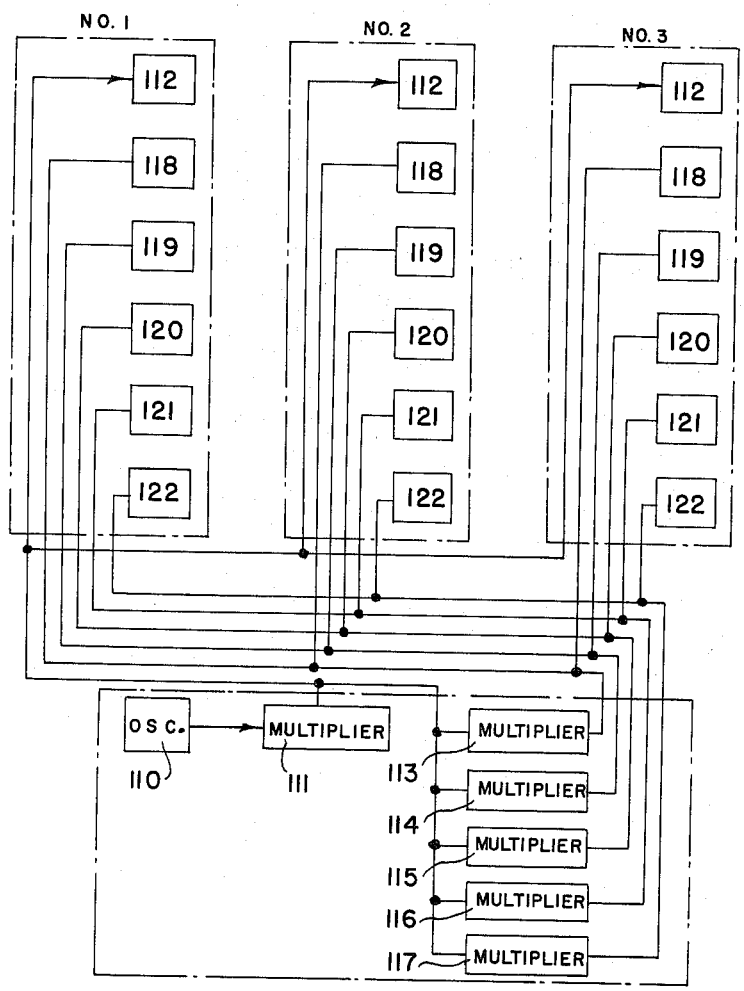
FIG. 4 is a block diagram showing a plurality of machines controlled from a master panel.

From the foregoing, it can be seen that the output of the signal generator 60 is a signal which has a frequency dependent upon the rate of rotation of the hob shaft 26. This signal is used as a feedback signal in controlling the operation of the motor 28. The rate of operation of the motor 28 is dictated by a command signal applied to the input of a phase comparator 65, shown in block form in FIG. 2. The phase comparator 65 is of a type well known to those skilled in the art and compares a command signal appearing on an input 66 with the feedback signal from the signal generator 60 which appears on an input line 67. When the signals are in phase with each other, the output of the phase comparator 65 is zero, but if the phase of the feedback signal 67 shifts in one direction with respect to the phase of the signal 66, the output signal from the phase comparator 65 will be of one polarity and have a magnitude dependent upon the amount of the phase shift; while if the signal shifts in the opposite direction with respect to the command signal, the output from the phase comparator 65 will be of the opposite polarity and again will have a magnitude dependent upon the magnitude of the phase shift. The signal from the phase comparator 65 is utilized as an error signal and is applied to the input of a power amplifier P for energizing the motor 28 in accordance with the error signal. Such drives are well known to those skilled in the art and the motor will operate in a direction dependent on the polarity of the error signal at a rate dependent on the magnitude of the signal.

If it is assumed that the command signal appearing on the input 66 has a frequency of 200 cycles per second and if the exciting winding of the signal generator 60 is energized with a signal of 200 cycles per second, it will be appreciated that the output signal from the signal generator 60 will be of the same frequency as the command signal when the motor 28 is at a standstill. Suitable phase shifting circuits may be provided to cause these signals to be in phase at this condition. These phase shifting components may be included as part of the signal generator 60. Now, if the frequency of the command signal on the input 66 is changed, for example, to a frequency of 150, the pulses applied to the phase comparator 65 over the inputs 66, 67 will not be in phase as was the case when the 200-cycle command signal was applied; but since the 200-cycle signal from the signal generator 60 is of higher frequency, the pulse from the signal generator 60 will be earlier in time than the pulse of the command signal and this phase shift between the pulses will cause an output signal of one polarity to occur on an output 68 of the comparator to the drive for the hob shaft 26. This error signal will cause the motor 28 to change its rate of operation to operate in the direction necessary to reduce the frequency of the 200-cycle output signal from the signal generator 60 and as the motor comes up to speed, the frequency will drop from 200 and when it reaches 150, the pulses will again be in phase and the error signal will be reduced to zero. Consequently, it can be seen that the phase comparator will operate to maintain the shaft of the motor 28 operating at a rate necessary to maintain an output frequency which is synchronized with the command signal. If the command signal had been changed to 250 cycles per second, the motor would have operated in the opposite direction to come up to ¼ speed where the output of the signal generator would be 250 cycles per second. As stated above, the phase comparator 65, the signal generator 60, and the drive P including the power amplifier for controlling the energization of the motor 28 have not been described in detail since these components are well known to those skilled in the art. It will be noted, however, that the signals will be in phase, even at the same operating rate, for given angular positions of the shaft 26. Consequently, by comparing the phase of the command and feedback signals, the motor 28 is locked to rotate with the command signals as well as at a rate corresponding to the frequency of the command signals so that an increment of shaft rotation is effected for each command signal.

Signal generators corresponding to the signal generator 60 are also associated with the other motors and such signal generators 69, 70, 71, 72, 73, respectively, are associated with the spindle 10 to provide a feedback signal for controlling the motor 15; the lead screw 34 to provide a feedback signal for controlling the motor 33; the frame 12 and the workhead 11 to provide a feedback signal for controlling the motor 16; the shaft 43 for providing a feedback signal for controlling the motor 46; and the frame portion 50 and the base plate 45 to provide a feedback signal for controlling the motor 51. The signal generators 69, 71 and 73 differ in form from the other generators in that they are designed to measure linear movement rather than angular movement; however, the principle of operation of the signal generators are the same.

In addition, each of the motors 15, 16, 33, 46, 51 have associated therewith a phase comparator and a power drive similar to the phase comparator 65 and power drive P associated with the motor 28, and these phase comparators and power drive have been given the same reference numeral as the motors controlled thereby, with an *a* applied thereto in the case of the phase comparators and with a *b* applied thereto in the case of the power drive.

In the preferred and illustrated embodiment, a master control panel 78 includes an oscillator 79 having an output connected to a multiplier circuit 81 having an output connected to excite the winding 61 of the signal generator 60. The output of the oscillator is also connected to the input of a multiplier circuit 80 having its output connected to the input 66 to provide a command signal of a predetermined frequency for the phase comparator 65.

In the preferred and illustrated embodiment, the signal generator 60 on the hob drive shaft 26 also provides a pulse signal for exciting the exciting windings of the other signal generators and is also used to provide the command signal to the phase comparator circuits 15a, 16a, 33a, 48a and 51a. The output signal from the pulse generator 60 is connected to the other phase comparators of the system through multiplying circuits 81 having outputs applied to the inputs of a respective one of the phase comparators 15a, 16a, 33a, 48a and 51a. These outputs are identified by the reference numeral 82. Similarly, the pulse signal from the pulse generator 60 is applied to the exciting windings of the other generators through respective multiplying circuits 84. When the signals for the other drives of the hobbing machine are derived from the hob arbor drive in the manner described, the other drives will be automatically operated in synchronism with the hob arbor drive, since the pulse signal from the pulse generator 60 will automatically change in frequency with any variation in the rate of hob rotation and this change in frequency will immediately effect a corresponding change in the other drives. If the output signal from the signal generator 60 is a pulse signal of 250 cycles per second and the multipliers 81, 84 associated with the work spindle index servodrive including the motor 15 are set to multiply the pulse signal by ½ and 1, respectively, the command signal to the work spindle index servodrive would have a frequency of 125, while the exciting signal would have a frequency of 250. Consequently an error signal would be developed until the spindle 10 was rotating in the proper direction to cause the output signal from the associated winding of the pulse generator 69 to have a frequency of 125 and this will occur when the spindle is operating at ½ speed. Now assuming that the output of the pulse generator 60 increases to 300 cycles per second, representing an increase in the rate of rotation of the hob arbor of 20 percent, the command signal input to the phase comparator circuit 15a will increase to 150 r.p.m., the exciting signal applied to the pulse generator 69 will increase to 300 r.p.m. and the servodrive will have to increase its rate of operation to provide a pulse signal of 150 cycles per second from the pulse generator. Consequently, the increase in frequency will be 25 cycles per second and it will be necessary for the motor to operate 20 percent faster in order to provide the necessary increase in frequency. Consequently, the drive remains synchronized since the frequency of the workhead index servodrive has been increased the same percentage as the frequency of the hob arbor drive.

It will be understood that the numerical examples given are by way of illustration and also that the input signal to the phase comparator 65 and the exciting frequency of the signal generator 60 might be of various frequencies to effect operation at a given rate. Moreover, the shaft 26 might be provided with a signal generator separate from the pulse generator for applying feedback signals to the phase comparator 65 so that higher or lower frequencies, as desired, might be obtained for the signals which are applied as the command signals to the phase comparators 15a, 16a, 33a, 48a and 51a and to the exciting windings of the pulse generators 69, 70, 71, 82 and 73.

The various multiplying circuits may be conventional binary multiplying circuits known to those skilled in the art and which multiply by the factor ½, ¼, ⅛, etc., or a summation of the factors in accordance with the setting of the circuit. Other suitable multiplying circuits whose multiplier may be changed may also be used, including those which multiply by a factor greater than 1.

Figure 3:
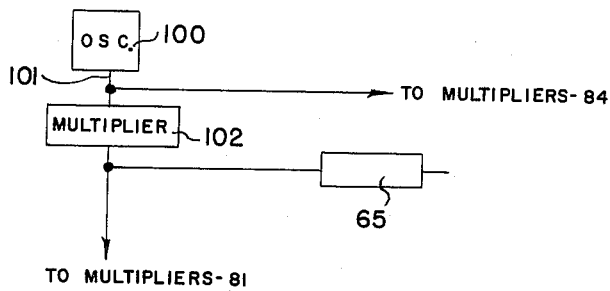
FIG. 3 is a fragmentary logic diagram showing a modified form of a control system.

It will be appreciated that a common oscillator in the control panel might be used to provide signals for all of the drives including the servodrive for the hob shaft. FIG. 3 indicates schematically one arrangement and in that arrangement a master oscillator 100 has an output connection 101 which is applied to the input of a multiplier 102 and also to the inputs of the multipliers for exciting the pulse generators associated with the servodrives through their respective multiplying circuits. The output of the multiplying circuit 102 is used as the command signal for the hob servodrive phase comparator 65 and is also applied as the input to the multiplying circuits 81 for the other servodrives. In this case, whenever the setting of the multiplying circuit 102 is changed to change the rate of rotation of the hob arbor, the other drives will be changed correspondingly to maintain the proper timed relationship between the operation of the various servodrives.

It will also be seen that the output 101 could be applied to a multiplying circuit individual to each servodrive including a multiply circuit individual to the hob arbor servodrive. If this is done, the changing of the hob arbor drive will not effect an automatic change in the other drives and the other multiplying circuits would have to be changed simultaneously with that for the hob arbor drive.

The described system is suitable for use to simultaneously control a plurality of hobbing machines. In such a system, the master control panel may have a master oscillator 110 having an output connection connected to the input of multiplying circuit 111 which, in turn, has an output connected to the hob servodrives 112 of each of the three machines. The output of the multiplying circuit 111 is also connected to the inputs of multiplying circuits 113, 114, 115, 116, 117, respectively, for a spindle index servodrive 118 of each machine, a workhead feed servodrive 119 for each machine, a hob arbor axial shift servodrive 120 for each machine, a hob angular position servodrive 121 for each machine, and a hob infeed servodrive 122 for each machine. Consequently, by setting the master control panel, the angular rates of rotation are synchronized in all machines.

As in the machine described, with reference to FIG. 3 the oscillator 110 could have its output connected to the inputs of each of the multipliers 113, 114, 115, 116, 117, but, in this case, the changing of the rate of hob rotation will not automatically effect a synchronism of the other elements of the machine therewith and all of the multiplying circuits would have to be changed to effect the proper timed operation of the various drives.

One problem arises in using a servodrive for driving the hob drive shaft 26. In a hobbing operation, the loading of the hob is not continuous but intermittent due to the nature of the hobbing operation. Consequently, the response of the servodrive must not be too quick. This should also be true of the other servodrives if the command signals therefor are derived from the rotation of the hob drive shaft. This problem can be minimized if the hob drive is constructed to be a high inertia drive.

It can now be seen that the present invention has provided a new and improved hobbing machine wherein the hob is driven by a servodrive including a motor supported in the hob head of the machine and connected to drive the hob drive shaft through a substantially direct drive connection and that a machine has been provided requiring no mechanical gearing to interlock the various drives of the machine.

While the preferred embodiment has been described in considerable detail, it is hereby my intention to cover all constructions, modifications and arrangements which fall within the ability of those skilled in the art and within the scope and spirit of the appended claims.

Having described my invention, I claim:

1. In a hobbing machine comprising a workhead including a work-supporting spindle rotatably supported on said workhead, a hob head including a rotatable hob drive shaft adapted to support and rotate a hob in hobbing relationship with a workpiece on said spindle, means supporting said hob head and workhead for relative movement parallel to the axis of said spindle, a first servodrive for effecting rotation of said shaft in response to a variable characteristic of a command signal including a first rotary motor on and movable with said hob head and having a substantially direct drive connection to said shaft, drive means operable to effect a relative feed movement axially of said spindle between said hob head and workhead, a second servodrive operable in response to a variable characteristic of a command signal and connected to said drive means to effect operation thereof in accordance with the variable characteristic of the command signal including a second rotary motor, and a third servodrive operable in response to a command signal for effecting rotation of said work spindle in accordance with a variable characteristic of the command signal and including a third rotary motor on said workhead and a substantially direct drive between said third rotary motor and said spindle.

2. A hobbing machine as defined in claim 1 wherein said command signals are pulse signals.

3. A hobbing machine as defined in claim 1 wherein said servodrives each include a phase comparator for comparing the phase of a command signal and a feedback signal to provide an error signal for the servodrive of a polarity and magnitude respectively dependent upon the direction of phase shift of the command and feedback signals and the magnitude of the phase shift and a signal generator driven by the servodrive for providing said feedback signal which has a frequency dependent upon the rate of operation of the servodrive.

4. In a hobbing machine comprising a workhead including a work-supporting spindle rotatably supported on said workhead, a hob head including a hob drive shaft adapted to support and rotate a hob in hobbing relationship with a workpiece on said spindle, means supporting said hob head and workhead for relative movement parallel to the axis of said spindle, a first servodrive for effecting rotation of said shaft in response to a command signal including a first rotary motor on and movable with said hob head and having a substantially direct drive to said shaft, drive means for effecting a relative feed movement axially of said spindle between said hob head and workhead, a second servodrive responsive to a variable characteristic of a command signal and connected to said drive means to effect operation thereof in accordance with the variable characteristic of the command signal including a second motor, and a third servodrive responsive to a variable characteristic of a command signal for effecting rotation of said work spindle in accordance with a variable characteristic of the command signal and including a third motor on said workhead and a substantially direct drive between said third motor and said spindle, control means for said servodrives including means providing a first command signal for said first servodrive and means for deriving command signals for the other of said servodrives synchronized with said first command signal.

5. A hobbing machine as defined in claim 4 wherein said signals are pulse signals.

6. In a hobbing machine comprising a workhead including a work-supporting spindle rotatably supported on said workhead, a hob head including a hob drive shaft adapted to support and rotate a hob in hobbing relationship with a workpiece on said spindle, means supporting said hob head and workhead for relative movement parallel to the axis of said spindle, a first servodrive for effecting rotation of said shaft in response to a command signal including a first rotary motor on and movable with said hob head and having a substantially direct drive connection to said shaft, drive means operable to effect a relative feed movement axially of said spindle between said hob head and workhead, a second servodrive responsive to variable characteristics of a compound signal and connected to said drive means to effect operation thereof in accordance with the variable characteristic of the command signal, and a third servodrive responsive to a command signal for effecting rotation of said work spindle in accordance with a variable characteristic of the command signal and including a third rotary motor on said workhead and a substantially direct drive between said third rotary motor and said spindle, control means for said servodrives including means providing a first command signal for effecting operation of the first servodrive at a predetermined rate and additional means deriving command signals for said other drives which have said characteristic to synchronize the other servodrives with the rotation of said hob shaft comprising a generator for generating a signal having a frequency dependent upon the rotation of said hob drive shaft, said other servodrives being drives which operate at a rate and in synchronism with the frequency of the applied signal.

7. A hobbing machine as defined in claim 6 wherein said generator is a pulse generator.

8. A hobbing machine comprising a workhead including a work-supporting spindle rotatably supported on said workhead, a hob head including a hob drive shaft adapted to support and rotate a hob in hobbing relationship with a workpiece on said spindle, first support means in said hob head supporting said shaft for rotation and for axial movement relative to the other parts of said hob head and first drive means for effecting axial movement of said shaft, means supporting said hob head and workhead for relative movement parallel to the axis of said spindle, a first servodrive for effecting rotation of said shaft in response to a variable characteristic of a command signal including a first rotary motor on and movable with said hob head and having a substantially direct drive connection to said shaft, second drive means rotatable to effect a relative movement axially of said spindle between said hob head and workhead, a second servodrive operable in response to a command signal and connected to said second drive means to effect operation thereof in accordance with a variable characteristic of the command signal including a second motor, a third servodrive operable in response to a command signal for effecting rotation of said work spindle in accordance with a variable characteristic of the command signal and including a third rotary motor on said workhead and a substantially direct drive between said third rotary motor and said spindle, a fourth servodrive responsive to a variable characteristic of a command signal and connected to said first drive means to effect axial movement of said shaft comprising a fourth motor on said hob head, second support means on said hob head supporting said first support means for angular movement about a radius of said spindle axis, a fifth servodrive responsive to a variable characteristic of a command signal for effecting angular movement of said second support means comprising a fifth motor mounted on said hob head, means supporting said hob head and workhead for relative movement along said radius, and a sixth servodrive responsive to a variable characteristic of a command signal for effecting said relative movement along said radius.

9. A hobbing machine comprising a workhead including a work-supporting spindle rotatably supported on said workhead, a hob head including a hob drive shaft adapted to support and rotate a hob in hobbing relationship with a workpiece on said spindle, support means supporting said shaft for rotation and for axial movement relative to the other parts of said hob head and first drive means for effecting axial movement of said shaft, means supporting said hob head and workhead for relative movement parallel to the axis of said spindle, a first servodrive for effecting rotation of said shaft in response to a command signal including a first rotary motor on and movable with said hob head and having a substantially direct drive connection to said shaft, second drive means operable to effect a relative movement axially of said spindle between said hob head and workhead, a second servodrive operable in response to a command signal and connected to said second drive means to effect operation thereof in accordance with a variable characteristic of the command signal including a second motor, a third servodrive operable in response to a command signal for effecting rotation of said work spindle in accordance with a variable characteristic of the command signal and including a third rotary motor on said workhead and a substantially direct drive between said third rotary motor and said spindle, a fourth servodrive responsive to a variable characteristic of a command signal and connected to said first drive means to effect axial movement of said shaft comprising a fourth motor on said hob head and a substantially direct drive from said fourth motor to said one of said parts, means on said hob head supporting said support means for angular movement about a radius of said spindle axis, a fifth servodrive responsive to a variable characteristic of a command signal for effecting angular movement of said support means comprising a fifth motor mounted on said hob head, means supporting said hob head and workhead for relative movement along said radius, and a sixth servodrive responsive to a variable characteristic of a command signal for effecting said relative movement along said radius.

10. A hobbing machine as defined in claim 8 wherein a signal generator is driven by said first servodrive and said command signals for the other servodrives are derived from said signal generator.

11. In combination, a plurality of hobbing machines, each of said machines comprising a workhead including a work-supporting spindle rotatably supported on said workhead, a hob head including a rotatable hob drive shaft adapted to support and rotate a hob in hobbing relationship with a workpiece on said spindle, means supporting said hob head and workhead for relative movement parallel to the axis of said spindle, a first servodrive for effecting rotation of said shaft in response to a variable characteristic of a command signal including a first rotary motor on and movable with said hob head and having a substantially direct drive connection to said shaft, drive means operable to effect a relative feed movement axially of said spindle between said hob head and workhead, a second servodrive operable in response to a variable characteristic of a command signal and connected to said drive means to effect operation thereof in accordance with the variable characteristic of the command signal including a second motor, and a third servodrive operable in response to a command signal for effecting operation of said work spindle in accordance with a variable characteristic of the command signal and including a third rotary motor on said workhead and a substantially direct drive between said third rotary motor and said spindle; a control system comprising a master control panel including a signal source providing an output signal having said characteristic and including means for adjusting said characteristic means for deriving first, second and third command signals having said characteristic for said first, second and third servodrives with said characteristic of each of said first, second and third command signals being a function of said output signal, and means connecting said first, second and third command signals to said first, second and third servodrives of said machines, said servodrives each including a comparator for comparing said command signal therefor and a feedback signal to derive an error signal for operating the motor of the respective servodrive in accordance with said characteristic of the command signal.

12. In combination, a plurality of hobbing machines with each of said machines comprising a workhead including a work-supporting spindle rotatably supported on said workhead, a hob head including a rotatable hob drive shaft adapted to support and rotate a hob in hobbing relationship with a workpiece on said spindle, means supporting said hob head and workhead for relative movement parallel to the axis of said spindle, a first servodrive for effecting rotation of said shaft in response to a variable characteristic of a command signal including a first rotary motor on and movable with said hob head and having a substantially direct drive connection to said shaft, drive means operable to effect a relative feed movement axially of said spindle between said hob head and workhead, a second servodrive operable in response to a variable characteristic of a command signal and connected to said drive means to effect operation thereof in accordance with the variable characteristic of the command signal including a second motor, and a third servodrive operable in response to a command signal for effecting rotation of said work spindle in accordance with a variable characteristic of the command signal and including a third rotary motor on said workhead and a substantially direct drive between said third rotary motor and said spindle; and a control system comprising a master panel including a signal source providing an output signal having said characteristic and means for adjusting said characteristic, means for deriving from said output signal as a function thereof a first command signal having said said characteristic for said first servodrives of said machines, and means for deriving second and third command signals having said characteristic for said second and third servodrives respectively from said first command signal as a function thereof; and means for applying said first, second and third command signals to said first, second and third servodrives of said machines, each of said servodrives including comparator for comparing the command signal thereto and a feedback signal to provide an error signal to control the operation of the motor of the respective servodrive.

13. In combination, a plurality of hobbing machines, each of said machines comprising a workhead including a work-supporting spindle and means rotatably supporting said spindle, a hob head including a hob drive shaft adapted to support and rotate a hob in hobbing relationship with a workpiece on said spindle, and first support means supporting said shaft for rotation and for axial movement relative to the other parts of said hob head and first drive means for effecting axial movement of said shaft, frame means supporting said hob head and workhead for relative movement parallel to the axis of said spindle, a first servodrive for effecting rotation of said shaft in response to a command signal including a first rotary motor on and movable with said hob head and having a substantially direct drive connection to said shaft, second drive means operable to effect a relative feed movement axially of said spindle between said hob head and workhead, a second servodrive operable in response to a command signal and connected to said second drive means to effect operation thereof in accordance with a variable characteristic of said command signal including a second motor, a third servodrive operable in response to a command signal for effecting rotation of said work spindle in accordance with a variable characteristic of the command signal and including a third rotary motor on said workhead and a substantially direct drive between said third rotary motor and said spindle, a fourth servo-drive connected to said first drive means to effect axial movement of said shaft comprising a fourth motor on said hob head, means on said hob head supporting said first support means for angular movement about a radius of said spindle axis, and a fifth servodrive for effecting angular movement of said first support means comprising a fifth motor mounted on said hob head, means supporting said hob head and workhead for relative movement along said radius, a sixth servodrive responsive to a variable characteristic of a command signal for effecting said relative movement along said radius; a control system comprising a master control panel including a signal source providing an output signal having said characteristic and means for deriving as a function of said output signal from said source first, second, third, fourth, fifth and sixth command signals having said characteristic for said first, second, third, fourth, fifth and sixth servodrive respectively, and means connecting said command signals to the respective servodrives of said machines, each of said servodrives including a comparator for comparing the command signal thereto and a feed back signal to provide an error signal for effecting the operation of the motor of the respective servodrive in synchronization with the command signal and in turn with the output signal from said source and said source including means for adjusting said output signals.

14. In combination, a plurality of hobbing machines, each of said machines comprising a workhead including a work-supporting spindle and means rotatably supporting said spindle, a hob head including a hob drive shaft adapted to support and rotate a hob in hobbing relationship with a workpiece on said spindle and first support means supporting said shaft for rotation and for axial movement relative to the other parts of said hob head and first drive means for effecting axial movement of said shaft, frame means supporting said hob head and workhead for relative movement parallel to the axis of said spindle, a first servodrive for effecting rotation of said shaft in response to a command signal including a first rotary motor on and movable with said hob head and having a substantially direct drive connection to said shaft, second drive means operable to effect a relative feed movement axially of said spindle between said hob head and workhead, a second servodrive operable in response to a command signal and connected to said second drive means to effect operation thereof in accordance with a variable characteristic of said command signal including a second motor, a third servodrive operable in response to a command signal for effecting rotation of said work spindle in accordance with a variable characteristic of the command signal and including a third rotary motor on said workhead and a substantially direct drive between said third rotary motor and said spindle, a fourth servodrive connected to first drive means to effect axial movement of said shaft comprising a rotary fourth motor on said hob head, means on said hob head supporting said support means for angular movement about a radius of said spindle axis, and a fifth servodrive for effecting angular movement of said support means comprising a fifth motor mounted on said hob head, means supporting said hob head and workhead for relative movement along said radius, a sixth servodrive responsive to a variable characteristic of a command signal for effecting said relative movement along said radius; a control system comprising a master panel including a signal source providing an output signal having said characteristic, means for deriving as a function of said characteristic of said output signal a first command signal having said characteristic for said first servodrives of said machines, means for deriving as a function of said characteristic of said first command signal, second, third, fourth, fifth and sixth command signals for said second, third, fourth, fifth and sixth servodrives respectively, and means for applying said command signals to the respective servodrives of said machines, each of said servodrives including a comparator for comparing the command signal applied thereto with a feed signal and for providing an error signal for operating the motor of the respective servodrive in connection with the characteristic of said command signal and said signal source including means for adjusting said characteristic of said output signal.

15. A hobbing machine having a rotatable work support spindle, a motor for rotating said spindle, a hob head for supporting and rotating a hob in operative relationship with respect to a workpiece supported in said spindle, said hob head including a frame, a hob drive shaft adapted to support and rotate a hob support, means mounting said shaft on said frame for axial and rotational movement, a motor on said frame connected to said hob drive shaft to rotate said shaft and the hob thereon, and a second motor on said frame operatively connected to said shaft for effecting axial movement thereof.

References Cited by the Examiner
UNITED STATES PATENTS

| | | | |
|---|---|---|---|
| 2,537,967 | 1/1951 | Carlin | 90—4 |
| 2,729,033 | 1/1956 | Prucknicki et al. | 51—287 X |
| 2,906,178 | 9/1959 | Cotta | 90—4 |
| 2,924,768 | 2/1960 | Farrand et al. | 318—39 X |
| 2,937,365 | 5/1960 | Peaslee | 318—39 X |
| 2,988,681 | 6/1961 | Bower. | |

FOREIGN PATENTS

| | | |
|---|---|---|
| 619,088 | 4/1961 | Canada. |
| 1,049,495 | 8/1953 | France. |
| 1,098,789 | 2/1961 | Germany. |
| 471,236 | 8/1937 | Great Britain. |
| 837,817 | 6/1960 | Great Britain. |

WILLIAM W. DYER, Jr., *Primary Examiner.*

LEON PEAR, ANDREW R. JUHASZ, *Examiners.*